United States Patent
Turner

[11] 3,965,743
[45] June 29, 1976

[54] AUTOMATIC ON-OFF ELECTRONIC SWITCH

[75] Inventor: Robert Bruce Turner, Weymouth, Mass.

[73] Assignee: American Medical Electronics Corporation, Newton Upper Falls, Mass.

[22] Filed: May 28, 1974

[21] Appl. No.: 473,493

[52] U.S. Cl. .......................................... 73/362 AR
[51] Int. Cl.² ........................................ G01K 7/24
[58] Field of Search ............... 73/362 AR, 343, 344; 320/32, 13

[56] References Cited
UNITED STATES PATENTS

| | | | |
|---|---|---|---|
| 3,621,276 | 11/1971 | Mitchell | 320/13 |
| 3,702,076 | 11/1972 | Georgi | 73/362 AR |
| 3,785,207 | 1/1974 | Brzezinski | 73/362 AR |
| 3,817,105 | 6/1974 | Luhowy | 73/362 AR |

Primary Examiner—Richard E. Aegerter
Assistant Examiner—Willis Little
Attorney, Agent, or Firm—Joseph S. Iandiorio

[57] ABSTRACT

An electronic thermometer system comprising a temperature sensing circuit for measuring temperature variations and providing a first signal representative thereof; a temperature measuring circuit responsive to the first signal for producing a second signal representative of the temperature being sensed; a display circuit for indicating the measured temperature for a predetermined period; a power supply; an actuator device; and an automatic electronic switch responsive to the actuator to turn on and provide power from the power supply to the circuits during an interval at least as long as the predetermined period and to automatically turn off at the end of the interval, cease providing power to the circuits and end the display.

3 Claims, 3 Drawing Figures

AUTOMATIC ON-OFF ELECTRONIC SWITCH

FIELD OF INVENTION

This invention relates to an electronic thermometer having an automatic electronic switch for independently holding the system on for a limited time and then automatically turning it off to conserve power.

BACKGROUND OF INVENTION

Recent advances in technology have made more appealing the widespread use of electronic thermometers to measure temperature, especially in the medical field. Typically such systems include a thermometer unit and a temperature sensing probe unit which may be used with disposable covers. These systems are initially relatively expensive compared to mercury thermometers but over their useful life they cost considerably less to use and are less consuming of the time of scarce and expensive medical personnel. However, since these thermometers are electronic they require electrical power for their operation which is supplied in the form of batteries to promote the portability of the electronic thermometer systems. The system requires substantial electrical power to operate the sensing and measuring circuits and to operate the display; as a result the batteries may be relatively quite large and heavy in order to provide sufficient power for operating the system over a reasonable period of time. Periodically the batteries are removed and replaced with new ones at additional cost or the system is removed from service while the batteries are recharged. Poorer battery duty cycles result if the user habitually unnecessarily extends the measuring and display period or inadvertently fails to switch off the system at the end of its use.

SUMMARY OF INVENTION

It is therefore an object of this invention to provide an improved electronic thermometer system extremely conservative of electric power.

It is a further object of this invention to provide such a system which independently, automatically turns off the system, including the display, a predetermined time after the system is energized.

The invention features an electronic thermometer system comprising a temperature sensing circuit for sensing temperature variations and providing a first signal representative thereof and a temperature measuring circuit which is responsive to the first signal for producing a second signal representative of the temperature being sensed. A display circuit indicates the measured temperature for a predetermined period. There is a power supply, an actuator and an automatic electronic switch responsive to the actuator to turn on and provide power from the power supply to the circuits during an interval at least as long as the predetermined period and to automatically turn off at the end of that interval and cesae providing power to the circuit thereby ending the display.

In preferred embodiments the system may also include a time measuring circuit whose output will be displayed by the display circuit during another period of time. Typically the time is displayed during a first period and the temperature during the next period.

DISCLOSURE OF PREFERRED EMBODIMENT

Other objects, features and advantages will occur from the following description of a preferred embodiment and the accompanying drawings, in which.

Figure 1:
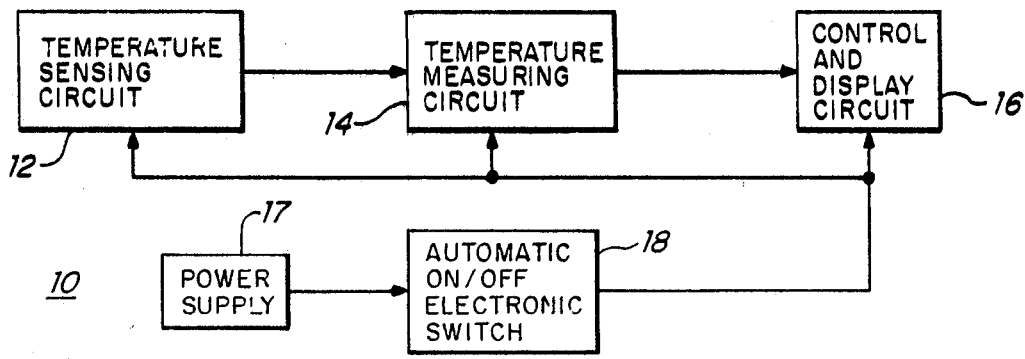
FIG. 1 is a block diagram of an electronic thermometer system using an automatic on-off electronic switch according to this invention.

There is shown in FIG. 1 an electronic thermometer system 10 according to this invention including a temperature sensing circuit 12 which senses variations in temperature and provides a signal representative thereof to measuring circuit 14 which responds by providing a signal representative of the measured temperature to control and display circuit 16. Power is supplied to circuits 12, 14 and 16 from power supply 17 under the control of automatic on-off electronic switch 18.

In preferred embodiments measuring circuit 14 may include a voltage to rate converter or similar analog to digital converter which provides a series of pulses representing the measured temperature to control and display circuit 16. Control and display circuit 16 may include counting circuits for counting pulses from measuring circuit 14 and a digital display for displaying the measured temperature. Control and display circuit may also include a time measuring circuit and control circuitry for displaying the time during one period and the temperature during another.

Figure 2:
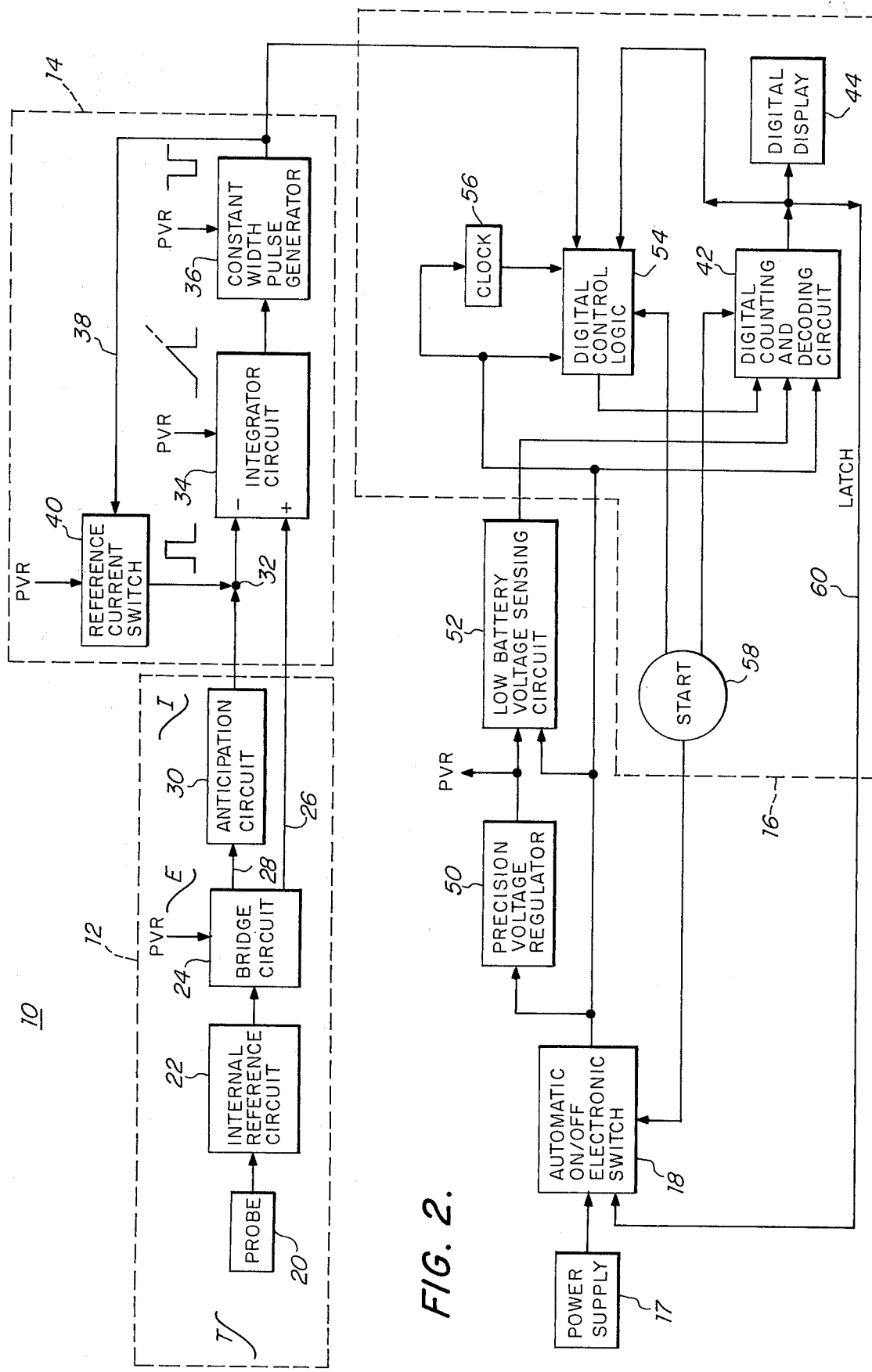
FIG. 2 is a more detailed block diagram illustrating one implementation of the system of FIG. 1.

In one specific embodiment temperature sensing circuit 12 may include a probe 20, FIG. 2, for sensing a temperature to be measured and producing a signal representative thereof which is submitted through internal reference circuit 22 to bridge circuit 24. Internal reference circuit 22 selectively connects a matching circuit to bridge circuit 24 in place of the input from probe 20 so that the accuracy and operation of the system can be verified. Bridge circuit 24 provides a reference output on line 26 and on line 28 provides a varying output as a function of the bridge imbalance: an analog signal which is a function of the temperature sensed by probe 20. In this system used primarily to take the temperatures of humans the measurement range is from 90°F to 110°F. Thus reference output 26 of bridge circuit 24 represents the level of 90°F; when output 28 of bridge circuit 24 is equal to reference output 26 theremometer probe 20 is measuring a temperature of 90°F. When output 28 is at a predetermined deviation from the level of output 26 probe 20 is measuring 110°F. Output 28 is fed to anticipation circuit 30 which senses the rate of change of the temperature being sensed by probe 20 and adds to the signal on output 28 from bridge circuit 24, thereby providing a signal at summing point 32 in voltage to rate converter 14 representative of the final value of the temperature being sensed in advance of the actual sensing of that final value.

In measuring circuit 14 the signal at summing point 32 is directed to the negative input of integrator circuit 34 whose positive input receives reference output 26 from bridge circuit 24. A difference between summing point 32 and reference output 26 at the input to integrator 34 causes it to provide a positive slope ramp at its output to constant width pulse generator 36, which provides a negative going output pulse of fixed width when the ramp reaches a predetermined voltage level. The fixed width pulse is delivered along feedback line 38 to reference current switch 40 which produces a positive going pulse having fixed width and fixed amplitude and delivers it to summing point 32. The presence of this pulse temporarily restores summing point 32 to the level of output 26 causing the integrator circuit output to drop resulting in a sawtooth output signal. Constant width pulse generator 36 then produces no further pulses to reference current switch 40. Therefore no pulses are delivered to summing point 32 and the level at summing point 32 once again moves away from that at the reference output 26. This causes integrator circuit 34 to provide another positive ramp and the cycle to begin again. Since the pulse fed back to summing point 32 has fixed width and fixed amplitude it is the rate of those pulses which must adjust to the relative imbalance between summing point 32 and reference output 26. Thus the greater the difference between these two inputs to integrator circuit 34 the higher will be the repetition rate of the pulses provided at the output of constant width pulse generator 36; this repetition rate is proportional to the temperature being sensed by probe 20. The illustrated configuration of measuring circuit 14 in FIG. 2 which includes summing point 32, integrator circuit 34, constant width pulse generator 36, feedback line 38 and reference current switch 40 is but one example of a voltage to rate converter which may be used. For example a voltage controlled oscillator or other means for producing an output whose frequency varies in proportion to an analog input signal may be used.

Control and display circuit 16 includes digital counting and decoding circuit 42 which counts the digital pulses provided at the output of constant width pulse generator 36 and decodes that count to display the measured temperature on digital display 44.

Precision voltage regulator 50 provides regulated voltage, PVR, to bridge circuit 24, reference current switch 40, integrator circuit 34, constant width pulse generator 36 and low battery voltage sensing circuit 52. The other input to low battery voltage sensing circuit 52 is the unregulated power supplied at the output of automatic on-off electronic switch 18. When the unregulated power supply voltage decreases to a predetermined level relative to the regulated voltage output provided by precision voltage regulator 50, low battery voltage sensing circuit 52 provides a signal to digital counting and decoding circuit 42 causing it to extinguish the least significant digit of the temperature appearing in digital display 44.

The specific embodiment of electronic thermometer system 10 illustrated in FIG. 2 operates in two modes: a time display mode and a temperature display mode. Digital control logic 54 supervises system performance in each of these modes and controls the transition between them as a function of control and display circuit 16. In the time display mode digital control logic 54 passes pulses from clock 56 to digital counting and decoding circuit 42; while in the temperature display mode digital control logic 54 directs pulses from constant width pulse generator 36 to digital counting and decoding circuit 42. The system is operated by actuation of start switch 58.

In operation when start switch 58 is actuated automatic on-off electronic switch 18 is turned on to supply power from power supply 46 to the rest of the system and digital control logic 54 and digital counting and decoding circuits 42 are reset. Probe 20 in contact with the patient whose temperature is to be measured begins to sense the temperature. As the probe temperature T increases, the voltage E at output 28 of bridge circuit 24 decreases, increasing the negative current I at summing point 32. The difference in levels of output 26 and summing point 32 causes pulses to be generated at the output of constant width pulse generator 36 at a repetition rate required to restore summing point 32 to the proper level. The repetition rate of the pulses at the output of constant width pulse generator 36 stabilizes in a short period of time to represent the final value of the temperature being sensed. This time may be reduced still further by the use of anticipation circuit 30 as explained previously.

Simultaneously with this action, upon the actuation of start switch 58, automatic on-off electronic switch 18 latches itself to stay on for a predetermined period of time after the start switch 58 has been operated. In this particular embodiment, where there is both a time and a temperature measurement and display the interval of operation includes both the period of the time display mode and the period of the temperature display mode e.g. 20 seconds and 10 seconds, respectively. A signal to automatic on-off electronic switch 18 on line 60 signifies the end of the period of the time display mode and the start of the temperature display mode.

Simultaneously with the actuation of start switch 58 digital control logic 54 passes clock pulses from clock 56 to digital counting and decoding circuit 42. These clock pulses may have a duration of 100 milliseconds so that a count of 10 such clock pulses by digital counting and decoding circuit 42 indicates one second. At the end of each second so accumulated digital display 44 is enabled to display the number 1 through 19 representing the time. At the end of the 20th second digital control logic 54 transfers the system into the temperature display mode by permitting passage, for the period of one clock pulse, of the pulses at the output of constant width pulse generator 36 to digital counting and decoding circuit 42 which accumulates and decodes the count and causes the temperature to be displayed.

Figure 3:
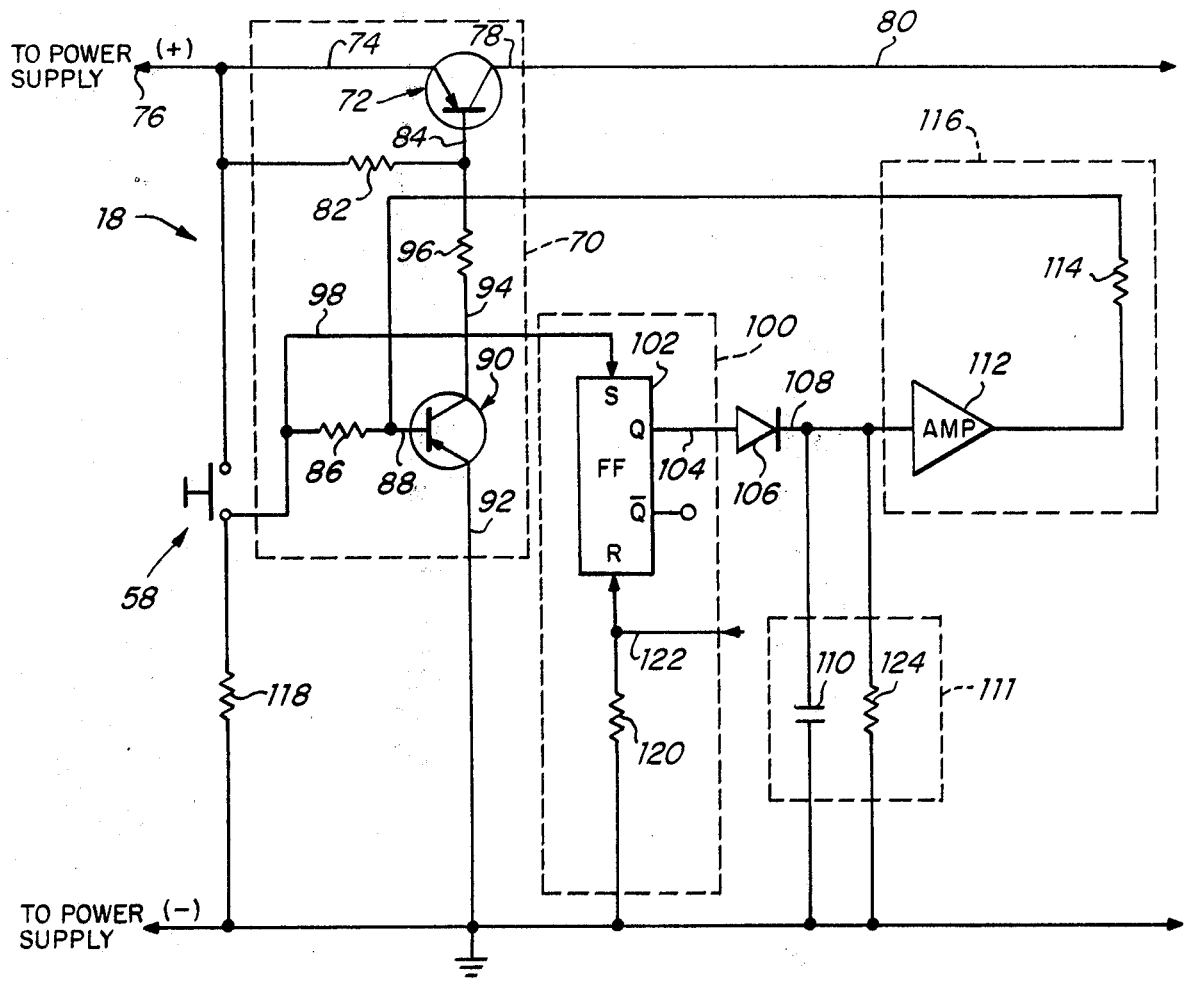
FIG. 3 is a more detailed schematic diagram of the automatic on-off electronic switch shown in FIGS. 1 and 2.

Preferably automatic on-off electronic switch 18 includes switching circuit 70, FIG. 3, including transistor 72 having its emitter 74 connected to the positive terminal 76 of power supply 17 and its collector 78 connected to the positive power line 80. Transistor 72 is held normally in a non-conducting state by means of resistor 82 which is connected between base 84 and emitter 74 and which keeps base 84 within six tenths (0.6) of a volt of emitter 74. In switching circuit 70 resistor 86 holds base 88 of transistor 90 within six tenths (0.6) of a volt of ground so that transistor 90 is also normally in a non-conducting state. The emitter 92 of transistor 90 is connected to ground and the collector 94 is connected through resistor 96 to the base 84 of transistor 72. When start switch 58 is closed the voltage at resistor 86 moves toward the level of positive power supply terminal 76 increasing the voltage at base 88 of transistor 90 causing that transistor to conduct. This causes current to be drawn through resistor 96 driving the base 84 of transistor 72 toward ground and causing it to conduct and supply power to the rest of the circuit on line 80.

The pressing and releasing of start switch 58 provides a positive pulse on line 98 to timing circuit 100 which includes flip-flop 102. The signal on line 98 is delivered to the set inputs of flip-flop 102 causing its Q output 104 to go high. With Q output 104 high diode 106 is forward biased and a signal is provided on line 108 which charges capacitor 110 in timing circuit 111 and is fed back through amplifier 112 and resistor 114 in latch circuit 116 to the base 88 of transistor 90, thereby keeping it conducting even after start switch 58 has been released. In this condition transistor 72 continues to conduct and automatic on-off electronic switch 18 maintains itself in the on condition independent of external signals. Resistor 118 connects one pole of start switch 58 to ground and resistor 120 similarly connects the reset input R of flip-flop 102 with ground. After a predetermined time, in the specific system shown in FIG. 2, a signal is provided on line 122 signifying the end of the time display mode and resetting flip-flop 102. Diode 106 is now back biased by the lower signal on Q output 104 and so capacitor 110 discharges through resistor 124 for a predetermined period of time e.g. 10 seconds while the temperature is being displayed in the temperature mode. When the voltage on line 108 falls, the voltage fed back through latch circuit 116 to base 88 of transistor 90 also falls turning off transistor 90 and transistor 72 and automatically turning off power to the rest of the system. The interval during which automatic on-off electronic switch 18 remains energized need not necessarily include two periods; it may include only one period or more than two periods. If the temperature display period is the only one utilized, the temperature display period may be delayed for a short time after the interval begins in order to permit the temperature measuring circuit of the system to stabilize at a final temperature value.

Other embodiments will occur to those skilled in the art and are within the following claims:

What is claimed is:
1. An electronic thermometer system comprising:
a temperature sensing circuit for sensing temperature variations and providing a first signal representative thereof;
a temperature measuring circuit responsive to said first signal provided by said temperature sensing circuit for producing a second signal representative of the temperature being sensed;
a time measuring circuit;
a display circuit responsive to said time measuring circuit and said temperature measuring circuit, for indicating the measured temperature during one period and the measured time during another period;
a power supply;
an actuator; and
an automatic electronic switch responsive to an initial operation of said actuator to provide power from said power supply to said circuits and to continue to provide power from said power supply to said circuits independent of further operation of said actuator during an interval at least as long as the combined periods and automatically and independently of further operation of said actuator, at the end of said interval, to cease providing power to said circuits and end the display.
2. An electronic thermometer system comprising:
a temperature sensing circuit for sensing temperature variations and providing a first signal representative thereof;
a temperature measuring circuit responsive to said first signal provided by said temperature measuring circuit for producing a second signal representative of the temperature being sensed;
a time measuring circuit;
a display circuit, responsive to said time measuring circuit and said temperature measuring circuit, for indicating the measured time during a first period and the measured temperature during the next period;
a power supply;
an actuator; and
an automatic on-off electronic switch responsive to an initial operation of said actuator to turn on and provide power from said power supply to said circuits and to continue to provide power from said power supply to said circuits independent of further operation of said actuator during an interval at least as long as the combined periods and to automatically and independently of further operation of said actuator turn off at the end of said interval, cease providing power to said circuits and end the display.
3. An electronic thermometer system comprising:
a temperature sensing circuit for sensing temperature variations and providing a first signal representative thereof;
a temperature measuring circuit responsive to said first signal provided by said temperature measuring circuit for producing a second signal representative of the temperature being sensed;
a time measuring circuit;
a display circuit, responsive to said time measuring circuit and said temperature measuring circuit, for indicating the measured time during a first period and the measured temperature during the next period;
a power supply;
an actuator; and
an automatic electronic switch including a switching circuit responsive to operation of said actuator for providing power from said power supply to said system; a first timing circuit responsive to operation of said actuator to switch to a first condition and responsive to a signal from said time measuring circuit indicating that said system has reached the end of said first period to switch to a second condition; a second timing circuit responsive to the change of said first timing circuit from said first condition to said second condition to define said next period; and a latching circuit responsive to said first timing circuit in said first condition to enable said switching circuit to continue to provide power from said power supply to said system during said first period independent of further operation of said actuator and subsequently, responsive to said second timing circuit, to continue to provide power from said power supply to said system during said next period independent of further operation of said actuator and to automatically and independently of further operation of said actuator turn off at the end of said next period, cease providing power to said system and end the display.

* * * * *